US007904415B2

(12) United States Patent  (10) Patent No.: US 7,904,415 B2
Khatchatrian et al.  (45) Date of Patent: *Mar. 8, 2011

(54) SYSTEMS AND COMPUTER PROGRAM PRODUCTS TO MANAGE THE DISPLAY OF DATA ENTITIES AND RELATIONAL DATABASE STRUCTURES

(75) Inventors: Suzanna Khatchatrian, San Jose, CA (US); Craig R. Tomlyn, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 329 days.

This patent is subject to a terminal disclaimer.

(21) Appl. No.: 12/245,654

(22) Filed: Oct. 3, 2008

(65) Prior Publication Data

US 2009/0024658 A1    Jan. 22, 2009

Related U.S. Application Data

(63) Continuation of application No. 10/318,749, filed on Dec. 12, 2002, now Pat. No. 7,467,125.

(51) Int. Cl.
    *G06F 7/00* (2006.01)
(52) U.S. Cl. .......................................... 707/600; 707/805
(58) Field of Classification Search .................. None
    See application file for complete search history.

(56) References Cited

U.S. PATENT DOCUMENTS

| 5,889,520 | A | 3/1999 | Glaser |
| 5,933,831 | A | 8/1999 | Jorgensen |
| 5,986,673 | A | 11/1999 | Martz |
| 6,144,962 | A | 11/2000 | Weinberg et al. |
| 6,161,103 | A | 12/2000 | Rauer et al. |
| 6,167,396 | A | 12/2000 | Lokken |
| 6,205,447 | B1 | 3/2001 | Malloy |
| 6,353,452 | B1 | 3/2002 | Hamada et al. |
| 6,363,353 | B1 | 3/2002 | Chen |
| 6,418,428 | B1 | 7/2002 | Bosch et al. |
| 6,448,985 | B1 | 9/2002 | McNally |
| 6,460,026 | B1 * | 10/2002 | Pasumansky ................. 707/737 |
| 6,466,239 | B2 | 10/2002 | Ishikawa |

(Continued)

FOREIGN PATENT DOCUMENTS

CN    1268709    10/2000

(Continued)

OTHER PUBLICATIONS

IDS Report, Jun. 24, 2009, from the Jun. 2009 Office Action for JP2004-558784, 1 p.

(Continued)

*Primary Examiner* — Neveen Abel Jalil
*Assistant Examiner* — Christyann R Pulliam
(74) *Attorney, Agent, or Firm* — Janaki K. Davda; Konrad Raynes & Victor LLP

(57) ABSTRACT

Systems and computer products that present typically large amounts of entity information with a graphical display that efficiently maps the display of a large number of OLAP objects to related relational database tables thereby retaining contextual information about the data associated with the objects and tables. The efficient mapping is enabled by the use of areas that contain and include objects. The preferred embodiment of the present invention enhances analysis, by OLAP techniques, of the objects and the associated relational database information. An embodiment of the present invention further operates in a recursive manner by enabling the objects to include and contain additional objects.

10 Claims, 4 Drawing Sheets

U.S. PATENT DOCUMENTS

| | | | |
|---|---|---|---|
| 6,473,102 B1 | 10/2002 | Rodden et al. | |
| 6,480,194 B1 | 11/2002 | Sang'udi et al. | |
| 6,496,204 B1 | 12/2002 | Nakamura | |
| 6,502,102 B1 | 12/2002 | Haswell et al. | |
| 6,581,068 B1 | 6/2003 | Bensoussan et al. | |
| 6,711,563 B1* | 3/2004 | Koskas | 707/769 |
| 6,801,229 B1 | 10/2004 | Tinkler | |
| 6,823,495 B1 | 11/2004 | Vedula et al. | |
| 6,831,668 B2 | 12/2004 | Cras et al. | |
| 6,944,830 B2 | 9/2005 | Card et al. | |
| 7,007,029 B1 | 2/2006 | Chen | |
| 7,467,125 B2* | 12/2008 | Khatchatrian et al. | 707/1 |
| 7,703,028 B2* | 4/2010 | Tomlyn | 715/764 |
| 2002/0059272 A1 | 5/2002 | Porter | |
| 2002/0070953 A1 | 6/2002 | Barg et al. | |
| 2002/0085041 A1 | 7/2002 | Ishikawa | |
| 2002/0118214 A1 | 8/2002 | Card et al. | |
| 2002/0124002 A1* | 9/2002 | Su et al. | 707/100 |
| 2002/0124082 A1 | 9/2002 | San Andres et al. | |
| 2002/0194167 A1 | 12/2002 | Bakalash et al. | |
| 2003/0001869 A1 | 1/2003 | Nissen | |
| 2003/0084059 A1 | 5/2003 | Kelley et al. | |
| 2003/0134599 A1 | 7/2003 | Pangrac et al. | |
| 2003/0163461 A1 | 8/2003 | Gudbjartsson et al. | |
| 2003/0187712 A1 | 10/2003 | Arthus et al. | |
| 2003/0187716 A1 | 10/2003 | Lee | |
| 2003/0225769 A1 | 12/2003 | Chkodrov et al. | |
| 2004/0034615 A1 | 2/2004 | Thomson et al. | |
| 2004/0064456 A1 | 4/2004 | Fong et al. | |
| 2004/0113942 A1 | 6/2004 | Tomlyn | |
| 2005/0015360 A1 | 1/2005 | Cras et al. | |
| 2005/0080802 A1 | 4/2005 | Cras et al. | |
| 2005/0086238 A1 | 4/2005 | Nevin, III | |

FOREIGN PATENT DOCUMENTS

| | | |
|---|---|---|
| CN | 1340174 | 3/2002 |
| JP | 10011599 | 1/1998 |
| JP | 63155260 | 6/1998 |
| WO | 0042530 | 7/2000 |
| WO | 0042532 | 7/2000 |
| WO | 0137120 | 5/2001 |

OTHER PUBLICATIONS

IDS Report, Oct. 21, 2009, from the Oct. 20, 2009 Office Action for JP2004-558784, 1 p.

Japanese Office Action & Translation of "Notification of Reasons for Refusal", Jun. 2009, for Application No. JP2004-558784, 6 pp.

Japanese Office Action & Translation of "Notice of Reasons for Rejection", Oct. 20, 2009, for Application No. JP2004-558784, 4 pp.

Patent Abstract & Translation for JP10011599, published on Jan. 16, 1998, 50 pp.

Patent Abstract for JP63-155260, published on Jun. 28, 1988, 1 p.

Browning, D. and J. Mundy, "Data Warehouse Design Considerations", Microsoft SQL 2000 Technical Articles, [online], Dec. 2001, [retrieved on Sep. 15, 2007], retrieved from the Internet at <URL: http://msdn2.microsoft.com/en-us/library/Aa902672(SQL.80,d=printer).aspx>, 20 pp.

Burns, M., "Administering OLAP with SAS/Warehouse Administrator(TM)", Paper 123, [online], [Retrieved on May 4, 2007], retrieved from the Internet at <URL: http://www2.sas.com/proceedings/sugi24/Dataware/p123-24.pdf>, 12 pp.

Chaudhuri, S., U. Dayal, and V. Ganti, "Database Technology for Decision Support Systems", Computer, vol. 34, Iss. 12, Dec. 2001, pp. 48-55.

Office Action 1, Apr. 15, 2005, for CN200310119727.3.

Office Action 2, Sep. 30, 2005, for CN200310119727.3, 6 pp.

Colossi, N., W. Malloy, & B. Reinwald, "Relational Extensions for OLAP", IBM Systems Journal, vol. 41, No. 4, Nov. 8, 2002, pp. 714-731.

EP Office Action, issued on May 22, 2006, for European Patent Application No. EP 03778589.6- 2201, 6 pp.

Exomedia, "ExoTips- Microsoft Excel 2000", [online], [retrieved on Sep. 28, 2007], retrieved from the Internet at <URL: http://www.exomedia.ca/resources/exotips_excel.cfm>, 3 pp.

Gucer, V., W. Crane, C. Molloy, S. Schubert, & R. Walker, "Introduction to Tivoli Enterprise Data Warehouse", IBM Corp. Redbooks, [online], May 2002, [Retrieved on May 4, 2007], retrieved from the Internet at <URL: http://www.redbooks.ibm.com/redbooks/pdfs/sg246607.pdf>, 31 pp.

IBM Corp., "Interactive Schema Diagram to Visually Represent Tables of Related Data and Meaningful Joins Between Tables", IBM Technical disclosure Bulletin, vol. 33, No. 9, Feb. 1991, pp. 243-246.

IBM Corp., "Visual Representation of Database Query Definition", IBM Technical Disclosure Bulletin, vol. 33, No. 9, Feb. 1991, pp. 238-242.

Lujan-Mora, S., "Multidimensional Modeling Using UML and XML", 2000, 8 pp.

Microsoft Excel 2000 Screenshots, in Office Action for U.S. Appl. No. 10/319,056, August 18, 2008, 3 pp.

Oracle Corp., "Logical Design in Data Warehouses",[online], [retrieved on Mar. 1, 2006], Oracle 9i Data Warehousing Guide, Release 2 (9.2) Part No. A96520-01, retrieved from the Internet at <URL: http://www.lc.leidenuniv.nl/awcourse/oracle/server.920/a96520/logical.htm>, 7 pp.

Oracle Corp., "Using the OLAP Analytic Workplace", [online], 2002, [Retrieved on Jan. 15, 2007], retrieved from the Internet at <URL: http://www.oracle.com/technology/obe/obe9ir2/obe-dwh/olap/olap.htm?_template=/ocom/...>, 32 pp.

International Preliminary Examination Report (IPER), Jun. 8, 2005, for International Application No. PCT/GB03/05300, 9 pp.

International Search Report , Aug. 16, 2004, for International Application No. PCT/GB03/05300.

Schieb, J., and M. Muller, "Das Windows NT 4 fur Workstation Buch", Sybex Verlag, Dusseldorf, Germany, 1996, pp. 290-292.

Schieb, J., and M. Muller, "Das Windows NT 4 fur Workstation Buch", Sybex Verlag, Dusseldorf, Germany, 1996, pp. 290-292 (Full English Translation).

Stolte, C., D. Tang, and P. Hanrahan, "Query, Analysis, and Visualization of Hierarchically Structured Data Using Polaris", Proceedings of the Eighth ACM SIGKDD International Conference on Knowledge Discovery and Data Mining, 2002, pp. 112-122.

Trujillo, J., M. Palomar, J. Gomez, and I. Song, "Designing Data Warehouses with OO Conceptual Models", Computer, vol. 4, Iss. 12, Dec. 2001, pp. 66-75.

Utting, K. and N. Yankelovich, "Context and Orientation in Hypermedia Networks", ACM Transactions on Information Systems, vol. 7, No. 1, January 1989, pp. 58-84.

Microsoft Excel 2000 Screenshots, in Office Action for U.S. Appl. No. 10/319,056, Oct. 3, 2007, 2 pp.

Eick, "New Visualization Techniques", [online], Feb. 2000, [retrieved Apr. 8, 2004] SIGGRAPH Computer Graphics Newsletter, vol. 34, No. 1, retrieved from the Internet at <URL: http://www.siggraph.org/publications/newsletter/v34n1/contributions/Eick.html>, 11 pp.

* cited by examiner

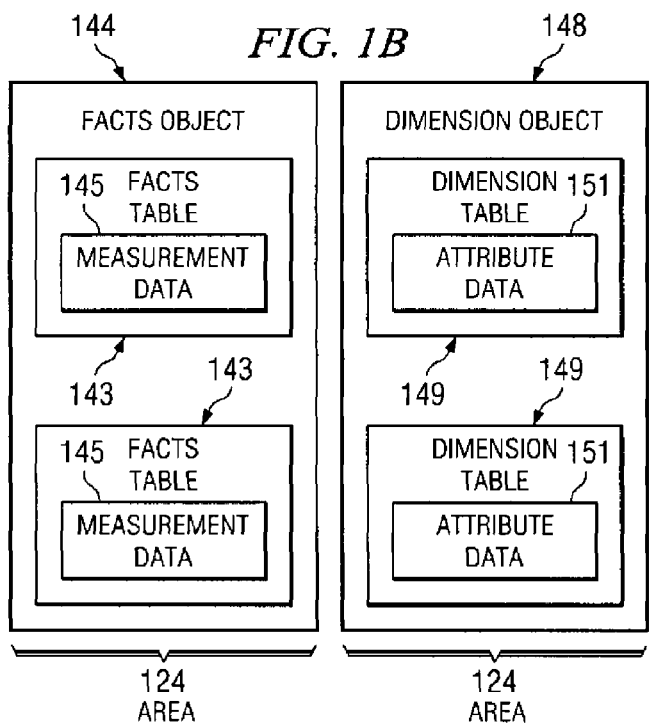

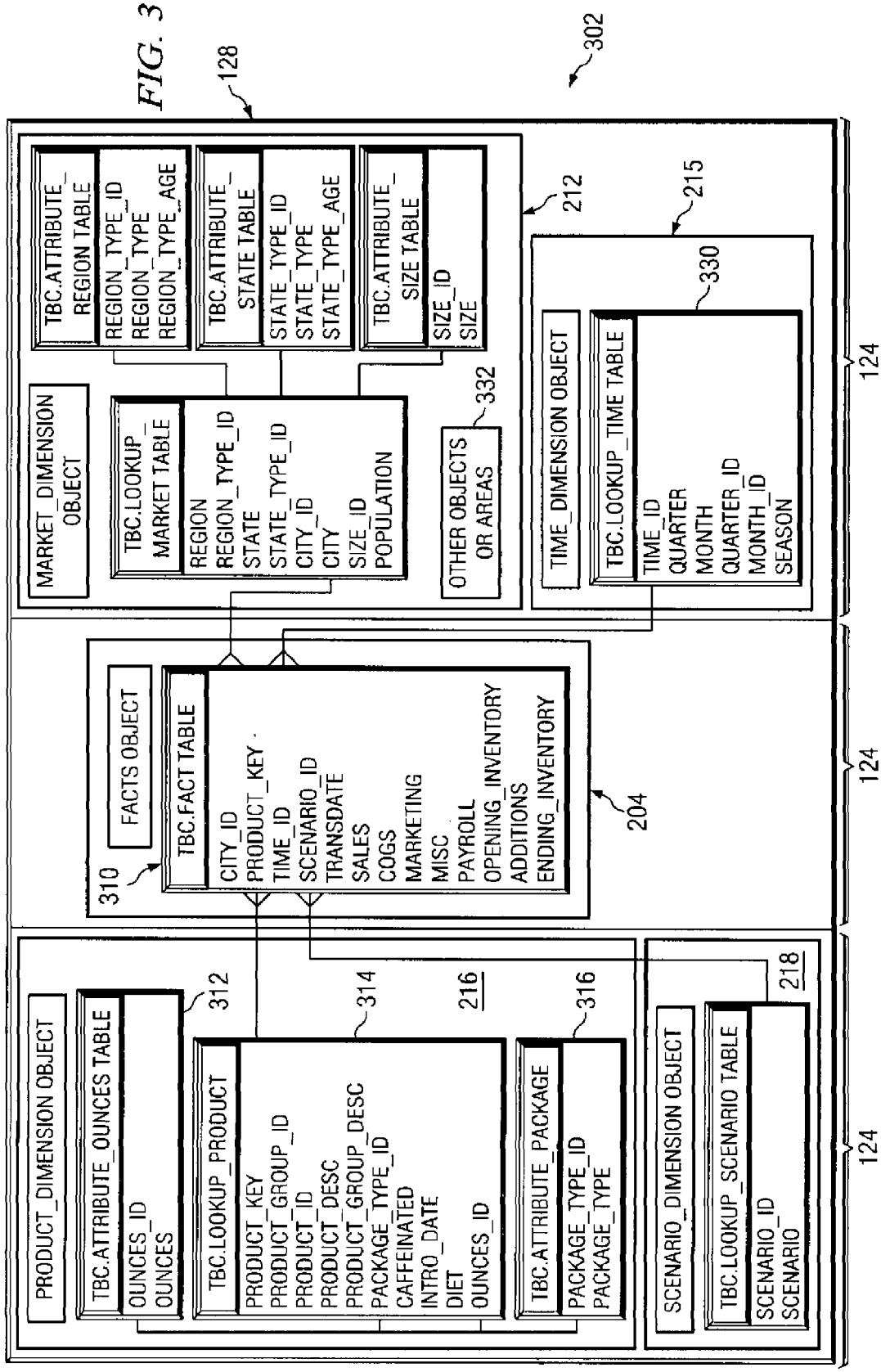

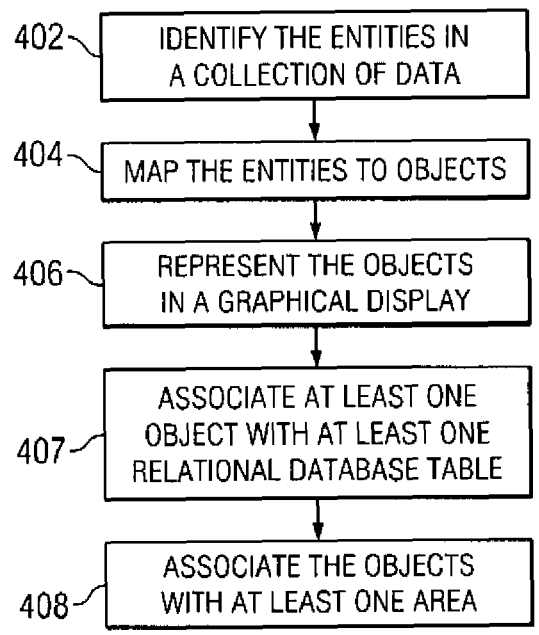
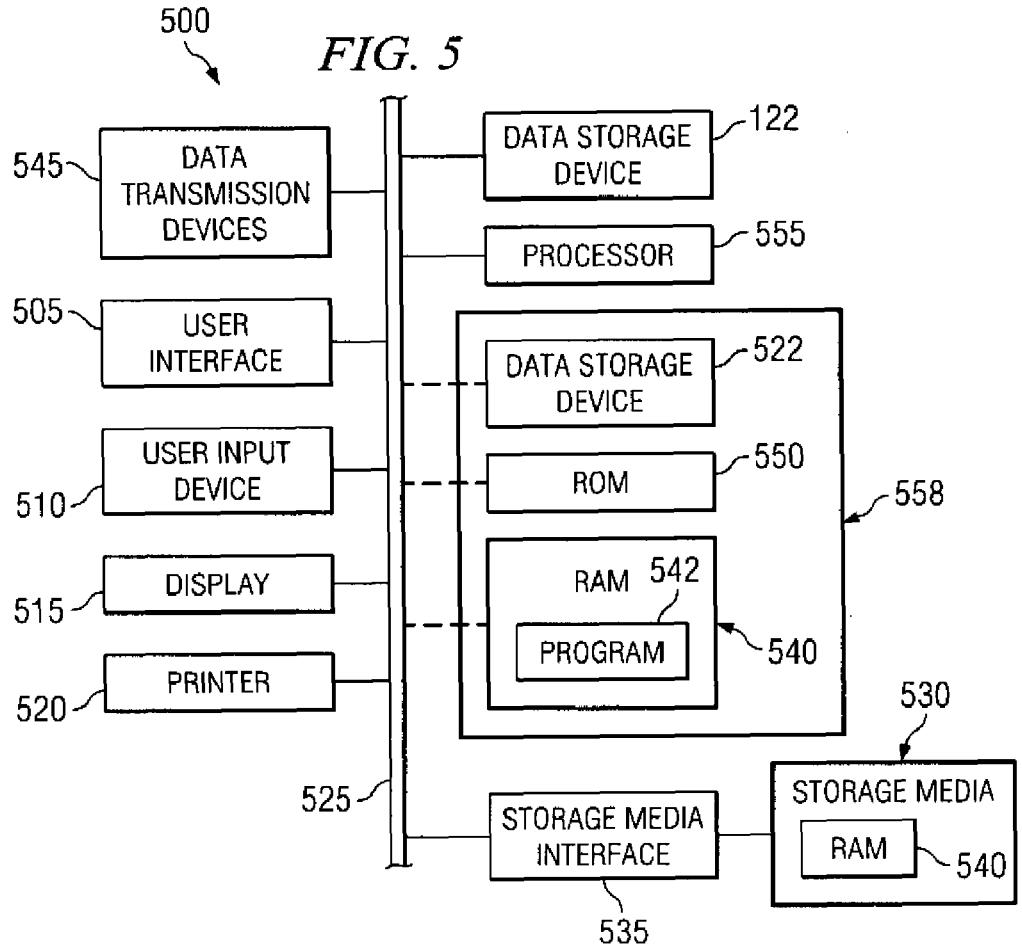

SYSTEMS AND COMPUTER PROGRAM PRODUCTS TO MANAGE THE DISPLAY OF DATA ENTITIES AND RELATIONAL DATABASE STRUCTURES

CROSS-REFERENCE TO RELATED APPLICATIONS

This application is a continuation of and claims the benefit of "SYSTEMS, METHODS, AND COMPUTER PROGRAM PRODUCTS TO MANAGE THE DISPLAY OF DATA ENTITIES AND RELATIONAL DATABASE STRUCTURES", having application Ser. No. 10/318,749, filed Dec. 12, 2002, the entire contents of which is incorporated herein by reference.

In pending application Ser. No. 10/319,056, entitled "SYSTEMS, METHODS, AND COMPUTER PROGRAM PRODUCTS TO MODIFY THE GRAPHICAL DISPLAY OF DATA ENTITIES AND RELATIONAL DATABASE STRUCTURES," filed on Dec. 12, 2002, by Tomlyn, assigned to the assignee of the present invention, and incorporated herein in its entirety by this reference, there is described a method of modifying the graphical display of OLAP entities. Although not limited thereto, the present invention employs such a method in one of its preferred embodiments.

BACKGROUND OF THE INVENTION

1. Field of the Invention

The present invention is directed to the field of graphical displays of database information. It is more particularly directed to managing the graphical display of a typically large number of data objects that efficiently presents mapped information about the relationship between the data objects that are stored in a relational database and that are used in on-line analytical processing.

2. Description of the Background Art

A computer-implemented database is a collection of data, organized in the form of tables. A table typically consists of columns that represent data of the same nature, and records that represent specific instances of data associated with the table. A relational database is a database that is typically a set of tables containing information that is manipulated in accordance with the relational model associated with the data. The product marketed under the trademarks IBM DB2 stores the data associated with the database in tables, and each table has a name.

On-Line Analytical Processing (OLAP) is a computing technique for summarizing, consolidating, viewing, analyzing, applying formulae to, and synthesizing data according to multiple dimensions. OLAP software enables users, such as analysts, managers, and executives, to gain insight into performance of an enterprise, such as a corporation, through rapid access to a wide variety of data dimensions that are organized to reflect the multidimensional nature of enterprise data, typically by means of hypotheses about possible trends in the data. More particularly, OLAP techniques may be used to analyze data from different viewpoints by identifying interesting associations in the information in a database. Therefore, OLAP is a decision support technique used in data management for the purpose of modeling and analyzing business information.

Data mining operations typically employ computer-based techniques to enable users to query structured data stored in computers in forms such as: multidimensional databases, conventional databases, or flat computer files. More particularly, data mining involves extracting computer-based information and enables a user to discover trends about the computer-based information.

An increasingly popular data model for OLAP applications, such as data mining, is the multidimensional database (MDDB). Often, data analysts use MDDBs during interactive exploration of business data for finding regions of anomalies in the data. Before this data can be explored, modeling needs to be enabled for the business. Modeling a business for an OLAP application may require large amounts of metadata including data entities.

In the past graphics tools have used objects, such as rectangle displays, to represent data entities, such as relational database tables. The objects are displayed so that they present the relationships between the data contained in the relational database tables. There has been a problem representing the OLAP systems associated with the data while simultaneously representing the relational database data structures associated with the storage of the data. For instance, data that is stored in a relational database is typically stored in the form of two-dimensional tables. While, OLAP data representation typically includes dimensional and measure data representation, relational database information is represented in the two-dimensional table format. Presentations in the past have attempted to show the mapping between the relational tables used to store the data and the OLAP objects that are presented for OLAP data analysis.

Representing the mapping of OLAP data to relational database data is difficult. Often, OLAP dimensional data objects are comprised of a plurality of relational database tables, and the plurality of relational database tables may include some of the same tables. By means of example OLAP data may include the number of sales that is measure data and also dimensional data about the type of products that were sold, the time frame of the sales, and the geographical market for the sales. In the past, representation of such data might include multiple references to relational database tables that are used to represent a dimension or a measure.

Given the large amount of OLAP data associated with the plurality of tables in databases, such as multidimensional databases and relational databases, the related graphical representation may require a typically large number of objects. Therefore, there may be many confusing representations of OLAP dimensions and measures when the mapped relational database table references are replicated to represent all their associations to OLAP dimensions and measures. This requires the data analyst to understand the complicated mapping structure in order to review information about the OLAP objects within the graphical display during analysis of OLAP data.

It would therefore be useful to be able to analyze typically large amounts of entity information with a graphical display that efficiently presents the mapping between the OLAP objects and the related relational database tables. When employing OLAP processing techniques it would be useful to be able to efficiently analyze multidimensional data with a graphical display that minimizes the disadvantages associated with current graphical displays. Graphical presentations in the past have not adequately displayed the mapping between the relational tables used to store the data and the OLAP objects that are presented for OLAP data analysis.

From the foregoing it will be apparent that there is still a need to improve the graphical display of a typically large number of objects so that the mapping between OLAP objects and related relational database tables is efficiently presented in order to enhance analysis of the objects and the associated data.

SUMMARY OF THE INVENTION

An embodiment of the present invention relates to systems, methods, and computer products that efficiently manage and present entity information in a graphical display. The graphical display efficiently maps OLAP objects that represent entity information to related relational database tables. An embodiment of the present invention enhances analysis of the objects and the associated database data by techniques such as data mining of relational database information and OLAP data. Techniques of the past have not been able to sufficiently retain contextual information about the data and thereby improve the graphical display of a typically large number of objects that are used with data analysis techniques such as data mining of relational database information, multidimensional data, and OLAP data.

The preferred embodiment of the present invention employs a technique that introduces areas that are containers for OLAP objects in the graphical display. These areas that represent OLAP objects contain other areas that represent database tables that are associated with the OLAP object. The preferred embodiment of the present invention advantageously keeps information about relational database tables together so that, within a given area container, the associated relational database tables are efficiently displayed. As discussed with reference to U.S. patent application 10/319,056, information represented in an area may be manipulated by techniques such as expansion, reduction, and movement, to enhance OLAP data analysis techniques.

The preferred embodiment of the present invention may rely on a typical star schema layout of data entities that includes a facts object, typically containing a single facts table, in the center of the graphical display surrounded by dimension objects. A star schema is a set of relational tables including multiple main tables, sometimes referred to as fact tables, and related dimension tables wherein the dimension tables intersect the main tables via common columns and wherein the dimension tables are each associated with a column in the main tables corresponding to each of the rows in the dimension tables. Because a star schema is simple, having few tables, it minimizes the complexity required to process database operations. This helps both to increase performance speed and to ensure correct results of database operations. Therefore many relational databases have been built in a star schema configuration to minimize database management overhead.

More particularly the star schema comprises fact tables, which are joined to one or more dimension tables according to specified relational or conditional operations. The fact tables hold measurement data, while the dimension tables hold attribute data. The dimension tables are usually joined to the fact tables with an equivalence condition.

The preferred embodiment of the present invention takes advantage of the star schema configuration to manage graphical display of the OLAP entities and the database structures. Since the star schema configuration may be logically represented by areas that represent fact tables or dimensions, the preferred embodiment of the present invention recognizes the affinity between associated objects in the area and represents the associated objects in the graphical display. That is, the affinity of OLAP objects in the same area is recognized and exploited by an embodiment of the present invention that groups the database structures associated with the OLAP objects in the same area.

An embodiment of the present invention is achieved by systems, methods, and computer products that improve the graphical display of a typically large number of objects that may be used with data analysis techniques such as data mining of relational database information, multidimensional data, and OLAP data. A method comprises: (a) identifying the entities in a collection of data, (b) mapping the entities to objects that are represented in the graphical display, (c) identifying the objects in at least one area, and (d) associating the objects within each at least one area. It will be appreciated that the present invention may be embodied in a graphical display that represents greater than two dimensions, such as a three-dimensional graphical display. Also, an embodiment of the present invention further operates in a recursive manner by enabling the objects to include and contain additional objects and areas.

An embodiment of the present invention novelly divides the graphical presentation into areas and allows objects to be manipulated independently within each area. More particularly, an embodiment of the present invention efficiently presents typically large amounts of entity information with a graphical display that efficiently maps the display of OLAP objects to associated relational database tables thereby enhancing analysis of the objects and the associated relational database data by OLAP techniques. This provides added flexibility when attempting to present many objects concurrently. It will be appreciated that the operation of the present invention is not limited to a relational database, a multidimensional database, or OLAP applications but may be applied to any computer-based graphical presentation that includes OLAP objects. Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 1A is a block diagram that illustrates the computer systems that may implement the present invention;

FIG. 1B is a block diagram that illustrates areas;

FIG. 2 is a block diagram that illustrates the problem addressed by the present invention;

FIG. 3 is a block diagram that illustrates an embodiment of the present invention;

FIG. 4 is a flow diagram that illustrates the present invention; and

FIG. 5 is a block diagram of a computer system suitably configured for employment of the present invention.

In the following detailed description and in the several figures of the drawings, like elements are identified with like reference numerals.

DETAILED DESCRIPTION OF THE INVENTION

Figure 1:
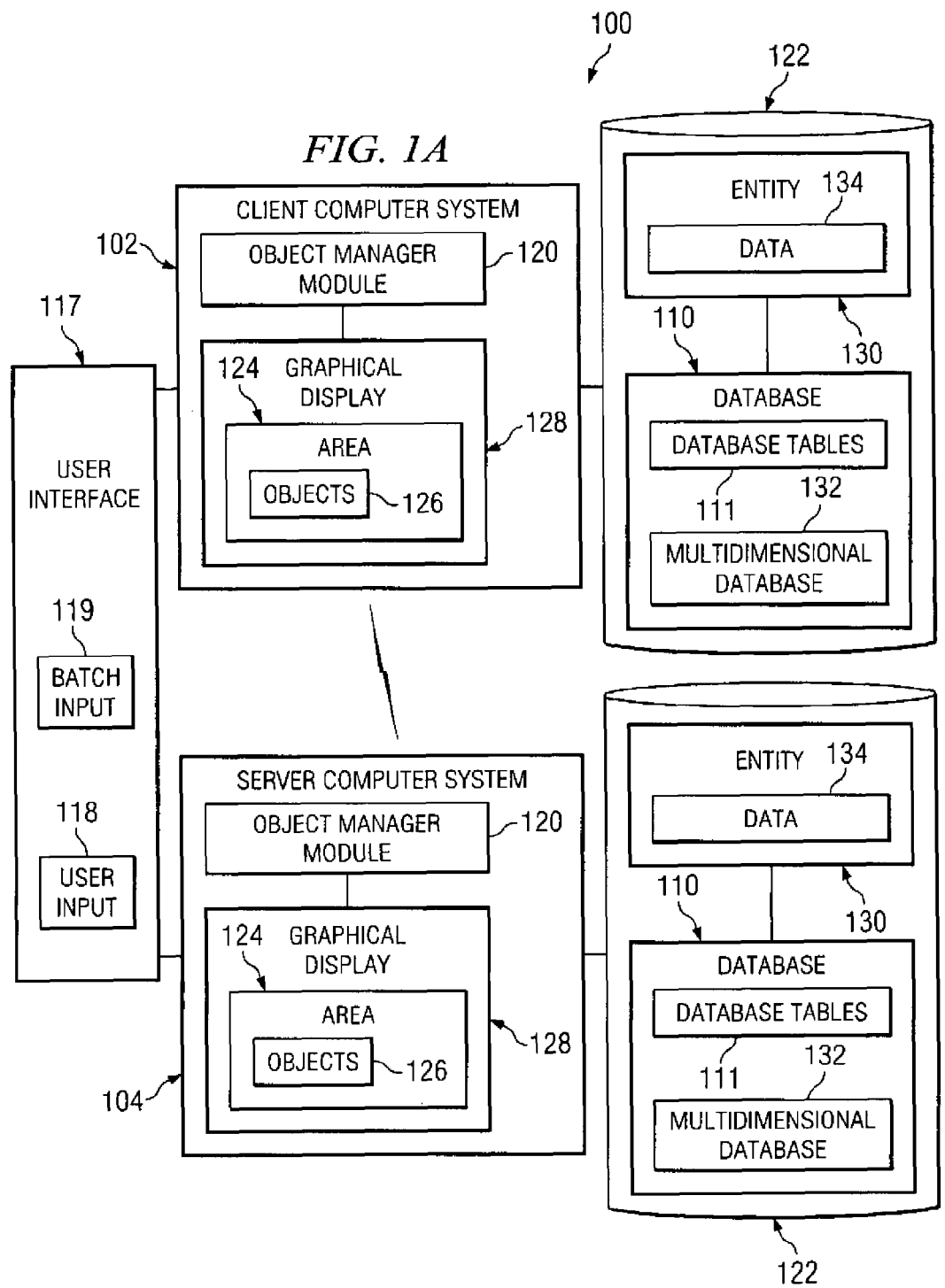
FIG. 1 includes FIG. 1A and FIG. 1B.

As shown in the drawings and for purposes of illustration, the embodiment of the invention efficiently presents typically large amounts of entity information with a graphical display that efficiently maps objects to related relational database tables. An embodiment of the present invention enhances analysis of the objects and the associated database data by techniques such as data mining of relational database information and OLAP data. Existing systems have not been able to sufficiently improve the graphical display of a typically large number of objects that may be used with data analysis techniques.

The present invention may be implemented with a graphical display that includes at least one area that includes objects that represent data entities. The present invention enables users to analyze data represented as objects in a graphical display by representing associated OLAP objects in the area. OLAP objects may also include and contain other objects, thereby representing the OLAP objects in a recursive configuration. The preferred embodiment of the present invention advantageously keeps information about relational database tables together so that, within a given area container, the associated relational database tables are efficiently displayed. This provides added flexibility when attempting to present OLAP objects concurrently.

FIG. 1 includes FIG. 1A and FIG. 1B. FIG. 1A is a block diagram that illustrates the computer systems that may operate with the present invention. As shown in FIG. 1 and in element 100, the preferred embodiment of the present invention may operate in a networked computer system configuration. Therefore, a client computer system 102 may communicate with a server computer system 104 during the operation of the present invention. The object manager module 120 operates in the client 102 or the server 104 to perform the preferred embodiment of the present invention. For example, information may be communicated to either the server 104 or the client 102 via the user interface 117; and may subsequently be used by the object manager module 120 to display a large number of objects 126 in an area 124 and the objects 126 are mapped to relational database tables 111. The user interface 117 may communicate with the preferred embodiment of the present invention, either via batch input 119 or user input 118. Further, the database 110 may be configured in the memory 558 of the client 102 or the server 104. Alternatively the database 110 may be configured in computer storage such as that of a disk 122. Element 558 is described with reference to FIG. 5.

According to the preferred embodiment of the present invention the object manager module 120 operates by generating a graphical display 128 that presents typically large amounts of entity information 130 by efficiently displaying OLAP objects 126 that represent the entity information 130, and the OLAP objects 126 are mapped to the related relational database tables 111 in at least one area 124. Data entities 130 may represent associations among objects 126; and about which data 134 may be stored in a database 110, such as a multidimensional database 132. Therefore by the operation of the present invention users may manipulate and analyze a large number of objects 126 and see at a glance the relationship between the objects 126 and the relational database table 111 that stores the associated data entity 130.

FIG. 1B is a block diagram that illustrates the facts objects 144 and the dimension objects 148 that may be contained in at least one area 124. Facts objects 144, such as the one illustrated in FIG. 1B, may include facts tables 143 that typically include measurement data 145. Dimension objects 148, such as the one illustrated in FIG. 1B, may include dimension tables 149 that typically include attribute data 151. Therefore, by means of example the dimensions objects 148 may be associated with a plurality of relational database tables 111. Relational database 110 operations, such as "join," may be performed on database tables 111, such as facts tables 143 and dimension tables 149. The fact tables 143 hold measurement data 145 that is typically numerical data 134. The dimension tables 149 hold attribute data 151 that may be represented in either numerical or character format. In the preferred embodiment of the present invention, an area 124 is novelly used to identify an affinity between associated objects 126 in the area 124. In a star schema configuration 302 the attribute data 151, such as specific information about product markets or product identification descriptors that is represented in a row in the dimension table 149 is used to identify columns in a facts table 143. Therefore, the preferred embodiment of the present invention novelly uses the star schema configuration 302 to group associated objects 126 that are mapped to related database tables 111. Elements 110, 111, and 134 are described with reference to FIG. 1, and element 302 is described with reference to FIG. 3.

As shown in FIG. 2, in the past it has been difficult to show on graphical displays 128 the mapping between the relational tables 111 used to store the data 134 and the OLAP objects 126 that are presented for OLAP data analysis. By further means of example, an object 126 may represent a data entity 130 such as a facts table 143 or a dimension table 149 in a relational database 110. An object 126 may alternatively represent OLAP data 134. In graphical displays 128 of the past the objects 126 were represented by either the names of relational tables 111 or by the names of dimension objects 148. Typically, when an OLAP object 126 is minimized the dimension object 148 name is displayed. When the OLAP object 126 is maximized in the graphical display 128 the names of the dimension objects 148 and the relational tables 111 are displayed. Therefore, in the past the conceptual representation of OLAP objects 126 was constrained to representations of relational database 110 structures. The problems caused by manipulation of objects 126 during analysis of the data entities 130 in the graphical display 128 include obscuring some of the objects 126 and loosing the contextual reference of the objects 126, thereby reducing the information available on the graphical display 128 for data analysis. Such problems are exacerbated by the ambiguity associated with the labels of the OLAP objects 126 when the representations of the OLAP objects 126 are minimized. Elements 110, 111, 126, 130, and 134, and 143, 148, and 149 are described with reference to FIG. 1.

In the present example, the following objects 126 are represented: Product_Dimension Object 216, Scenario_Dimension Object 218, Sales_Fact Object 217, Supplier_Dimension Object 219, Market_Dimension Object 212, Time Dimension Object 215, and Accounts_Dimension Object 213. The Market_Dimension Object 212 is associated with and represents dimensional tables 149, such as the Market Details Table 221 and the Market Table 223. By means of further explanation, the Market Table 223 includes the following columns: PopulationID 232, RegionID 234, State 236, and StateID 238. Also, the Market Details Table 221 includes the following columns: Director 242, Region 244, and RegionID 246.

The problem in the past with the minimized representation of OLAP objects 126, such as dimension objects 148, is that the same label for the dimension objects 148 has been used to represent and identify the dimensional object 148 that is associated with different relational database tables 111, such as dimension tables 149. This is ambiguous and leads to confusion during data analysis. In the present example the label, Market-Dimension Object 212 is used to represent an association with at least the two dimension tables 149: Market Details Table 221 and Market Table 223.

FIG. 3 is a block diagram that illustrates the preferred embodiment of the present invention. The preferred embodiment of the present invention employs a technique that maps relational database tables 111 to objects 126 that represent entities 130 and maintains the mapping by representing objects 126 as containers for other objects 126 or tables 111. Also, the novel use of an area 124 that contains objects 126 represents the association between the objects 126 and the relational database tables 111. Elements 111, 124, and 126 are described with reference to FIG. 1.

By means of example the facts object 144 (FACTS OBJECT 204) is mapped to the facts table 143 TBC.FACT_TABLE 310. A dimension object 148, such as the Product Dimension Object 216 may include specific dimension tables 149, such as: TBC.ATTRIBUTE_OUNCES Table 312, TBC.LOOKUP_PRODUCT Table 314, and TBC.ATTRIBUTE_PACKAGE Table 316. Other dimension objects 148 included in the present example are Market_Dimension Object 212, Time_Dimension Object 215, and Scenario_Dimension Object 218. The dimension objects 148 intersect the facts object 144 via common columns and one dimension table 149 is associated with a column in the fact table 143 corresponding to each of the rows in the dimension tables 149. In the present example, TBC.FACT Table 310 is a specific instance of the fact table 143 and is joined to one or more dimension tables 149 according to specified relational or conditional operations. For example, the Time_Dimension Object.TBC.LOOKUP_TIME Table 330 is joined to the TBC.FACT Table 310. Elements 143, 148, and 149 are described with reference to FIG. 1.

The preferred embodiment of the present invention takes advantage of the star schema configuration 302 to manage objects 126 in a particular area 124 within a graphical display 128. For example, the graphical display 128 of the present example illustrates a star schema configuration 302. An area 124 may include the Market_Dimension Object 212 and the Time_Dimension Object 215. The affinity of objects 126 in the same area 124 is recognized and exploited by an embodiment of the present invention that groups objects 126 into at least one area 124. Since the star schema configuration 302 may be represented by a series of areas 124, the preferred embodiment of the present invention illustrates affinity between associated objects 126 within a star schema configuration 302 and the associated database tables 111 by manipulating the graphical representation of objects 126 in areas 124.

Further, the preferred embodiment of the present invention novelly enables representation of areas 124 and objects 126 in a recursive manner, in which objects 126 may include and contain additional objects 126 or areas 124, as shown in element 332.

FIG. 4 is a flow diagram that illustrates the present invention that improves the graphical display 128 of a typically large number of objects 126 that may be used with data analysis techniques such as data mining of relational database 110 information, multidimensional database information, and OLAP data 134. Initially, as shown in element 402, the entities 130 in a collection of data 134 are identified. Then as shown in element 404 the entities 130 are novelly mapped to objects 126. Next, as shown in element 406 the objects 126 are represented in the graphical display 128. Also as shown in element 407, at least one object 126 is associated with at least one relational database table 111. According to a preferred embodiment of the present invention and as shown in element 408, the objects 126 are associated with at least one area 124 so that manipulation of an object 126 within the area 124 may be treated as one unit thereby retaining contextual information about the objects 126 and enhancing analysis of the objects 126 and the associated relational database 110 information by OLAP techniques. Elements 110, 111, 124, 126, 128, 130, and 134 are described with reference to FIG. 1.

FIG. 5 is a block diagram of a computer system 500, suitable for employment of the present invention. System 500 may be implemented on a general-purpose microcomputer, such as one of the members of the IBM Personal Computer family, or other conventional workstation or graphics computer devices. In its preferred embodiment, system 500 includes a user interface 505, a user input device 510, a display 515, a printer 520, a processor 555, a read only memory (ROM) 550, a data storage device 122, such as a hard drive, a random access memory (RAM) 540, and a storage media interface 535, all of which are coupled to a bus 525 or other communication means for communicating information. Although system 500 is represented herein as a standalone system, it is not limited to such, but instead can be part of a networked system. The computer system 500 may be connected locally or remotely to fixed or removable data storage devices 122 and data transmission devices 545. For example, the server computer system 104 and the client computer system 102 also could be connected to other computer systems 500 via the data transmission devices 545. Elements 102 and 104 are described with reference to FIG. 1.

The RAM 540, the data storage device 122 and the ROM 550, are memory components 558 that store data and instructions for controlling the operation of the processor 555, which may be configured as a single processor or as a plurality of processors. The processor 555 executes a program 542 to perform the methods of the present invention, as described herein.

While the program 542 is indicated as loaded into the RAM 540, it may be configured on a storage media 530 for subsequent loading into the data storage device 122, the ROM 550, or the RAM 540 via an appropriate storage media interface 535. Storage media 530 can be any conventional storage media such as a magnetic tape, an optical storage media, a compact disk, or a floppy disk. Alternatively, storage media 530 can be a random access memory 540, or other type of electronic storage, located on a remote storage system.

Generally, the computer programs and operating systems are all tangibly embodied in a computer usable device or medium, such as the memory 558, the data storage device 122, or the data transmission devices 545, thereby making an article of manufacture, such as a computer program product, according to the invention. As such, the terms "computer program product" as used herein are intended to encompass a computer program accessible from any computer usable device or medium.

Moreover, the computer programs 542 and operating systems are comprised of instructions which, when read and executed by the server computer system 104 and the client computer system 102, cause the server computer system 104 and the client computer system 102 to perform the steps necessary to implement and use the present invention. Under control of the operating system, the computer programs 542 may be loaded from the memory 558, the data storage device 122, or the data transmission devices 545 into the memories 558 of the server computer system 104 and the client computer system 102 for use during actual operations.

User interface 505 is an input device, such as a keyboard or speech recognition subsystem, for enabling a user to communicate information and command selections to the processor 555. The user can observe information generated by the system 500 via the display 515 or the printer 520. The user input device 510 is a device such as a mouse, track-ball, or joy stick that allows the user to manipulate a cursor on the display 515 for communicating additional information and command selections to the processor 555. Those skilled in the art will recognize many modifications may be made to this configuration without departing from the scope of the present invention.

When operating in accordance with one embodiment of the present invention, the system efficiently presents typically large amounts of entity 130 information with a graphical display 128 that maps OLAP objects 126 to relational database tables 111 for fast and efficient presentation of the typically large amount of data 134 and that enables efficient analysis of the data 134. It will be appreciated that the present invention offers many advantages over prior art techniques. Elements 111, 126, 128, 130, and 134 are described with reference to FIG. 1.

The present invention is typically implemented using one or more computer programs, each of which executes under the control of an operating system and causes the server computer system 104 and the client computer system 102 to perform the desired functions as described herein. Thus, using the present specification, the invention may be implemented as a machine, process, method, system, or article of manufacture by using standard programming and engineering techniques to produce software, firmware, hardware or any combination thereof.

It should be understood that various alternatives and modifications might be devised by those skilled in the art. However, these should not be viewed as limitations upon the practice of these teachings, as those skilled in the art, when guided by the foregoing teachings, may derive other suitable characteristics of a similar or different nature. The present invention is intended to embrace all such alternatives, modifications and variances that fall within the scope of the appended claims Trademarks IBM and DB2 are trademarks of International Business Machines Corporation in the United States, other countries, or both.

We claim:

1. A computer system to retain contextual information about data, said computer system having a processor and a graphical display and at least one entity that represents said data, comprising:
at least one facts table in a relational database that is mapped to at least one Online Analytical Processing (OLAP) object, wherein the at least one OLAP object is a facts object that is presented for OLAP data analysis, and wherein said facts table includes measurement data;
at least one dimension table in said relational database is mapped to a dimension object, wherein said at least one dimension table includes attribute data, and wherein said dimension object is an OLAP object that is presented for OLAP data analysis; said graphical display is generated, wherein said graphical display includes a series of three separate areas represented with rectangles and including a left rectangle that is adjacent to a middle rectangle that is adjacent to a right rectangle, wherein said separate areas represent a star schema configuration, wherein different portions of the star schema configuration are displayed in different areas, wherein each of said separate areas is a container that contains one or more OLAP objects each represented with separate rectangles and contains one or more additional tables that are associated with said one or more OLAP objects and each represented with separate rectangles within a rectangle containing an associated OLAP object, wherein any OLAP object represented by a rectangle includes at least one of an additional OLAP object or a table each represented with separate rectangles, and wherein said one or more OLAP objects are manipulated independently within each of said separate areas while retaining contextual information about the OLAP objects and displaying related tables within an area; and
said facts object is displayed in a first rectangle and said at least one associated facts table are each displayed in a separate rectangle within said first rectangle that includes said measurement data displayed in said middle rectangle, said dimension object represented in a second rectangle and said at least one associated dimension table each represented in said second rectangle, wherein said first dimension object is in one of said left rectangle or said right rectangle, and relationships between said facts table and said dimension table that are displayed in said graphical display to retain said contextual information about said data, wherein said relationships are shown across said separate rectangles in said graphical display, wherein one or more lines cross said separate rectangles and connect said measurement data of said at least one associated facts table in said middle rectangle and said attribute data of said at least one associated dimension table in said left rectangle or said right rectangle.

2. The computer system of claim 1, further comprising:
said relational database having at least one table in said computer; and
said at least one object that is associated with said at least one relational database table to retain said contextual information about said data and said associated at least one relational database table.

3. The computer system of claim 1, further comprising another said at least one area that is included in said at least one object.

4. The computer system of claim 3, further comprising another said at least one object that is included in said another at least one area.

5. The computer system of claim 1, further comprising said data that represents OLAP data.

6. An article of manufacture comprising a program usable storage medium embodying one or more computer usable instructions executable by a computer to retain contextual information about data, said computer having a graphical display and at least one entity that represents said data, wherein:
said computer usable instructions map at least one facts table in a relational database to at least one Online Analytical Processing (OLAP) object, wherein the at least one OLAP object is a facts object that is presented for OLAP data analysis, and wherein said facts table includes measurement data;
said computer usable instructions map at least one dimension table in said relational database to a dimension object, wherein said at least one dimension table includes attribute data, and wherein said dimension object is an OLAP object that is presented for OLAP data analysis;
said computer usable instructions generate said graphical display, wherein said graphical display includes a series of three separate areas represented with rectangles and including a left rectangle that is adjacent to a middle rectangle that is adjacent to a right rectangle, wherein said separate areas represent a star schema configuration, wherein different portions of the star schema configuration are displayed in different areas, wherein each of said separate areas is a container that contains one or more OLAP objects each represented with separate rectangles and contains one or more additional tables that are associated with said one or more OLAP objects and each represented with separate rectangles within a rectangle containing an associated OLAP object, wherein any OLAP object represented by a rectangle includes at least one of an additional OLAP object or a table each represented with separate rectangles, and wherein said one or more OLAP objects are manipulated independently within each of said separate areas while retaining contextual information about the OLAP objects and displaying related tables within an area; and said computer usable instructions display said facts object in a first rectangle and said at least one associated facts table each in a separate rectangle within said first rectangle that includes said measurement data in said middle rectangle, said dimension object represented in a second rectangle and said at least one associated dimension table each in separate rectangles in said second rectangle, wherein said first dimension object is in one of said left rectangle or said right rectangle, and relationships between said facts table and said dimension table in said graphical display to retain said contextual information about said data, wherein said relationships are shown across said separate rectangles in said graphical display, wherein one or more lines cross said separate rectangles and connect said measurement data of said at least one associated facts table in said middle rectangle and said attribute data of said at least one associated dimension table in said left rectangle or said right rectangle.

7. The article of manufacture of claim 6, wherein:

said computer usable instructions associate said at least one object with at least one relational database table in said relational database to retain said contextual information about said data and said associated at least one relational database table.

8. The article of manufacture of claim 6, wherein said computer usable instructions include another said at least one area in said at least one object.

9. The article of manufacture of claim 8, wherein said computer usable instructions include another said at least one object in said another at least one area.

10. The article of manufacture of claim 6, wherein said computer usable instructions represent OLAP data by said data.

\* \* \* \* \*